Nov. 19, 1968     N. O. ROSAEN     3,411,535

CARTRIDGE VALVES

Filed Aug. 17, 1966

INVENTOR
NILS O. ROSAEN

BY     ATTORNEYS 3,411,535
CARTRIDGE VALVES
Nils O. Rosaen, Bloomfield Hills, Mich., assignor of one-half to Borje O. Rosaen, Ann Arbor, Mich.
Continuation-in-part of applications Ser. No. 371,884, May 28, 1964, and Ser. No. 390,510, Aug. 9, 1964. This application Aug. 17, 1966, Ser. No. 572,934.
17 Claims. (Cl. 137—596.14)

ABSTRACT OF THE DISCLOSURE

A pilot operated cartridge valve having an outer piston movable between a first position opening fluid flow from an inlet through the piston and to a port adapted for connection to a fluid user and a second position closing the inlet and opening fluid flow from the port through the piston and to an outlet adapted for connection to the reservoir. An inner spring loaded piston carried within the outer piston momentarily maintains the inlet closed upon movement of the outer piston to the first position to provide a sufficient pressure build up within the valve assembly to insure operation of the valve movement actuating means.

---

Figure 1:
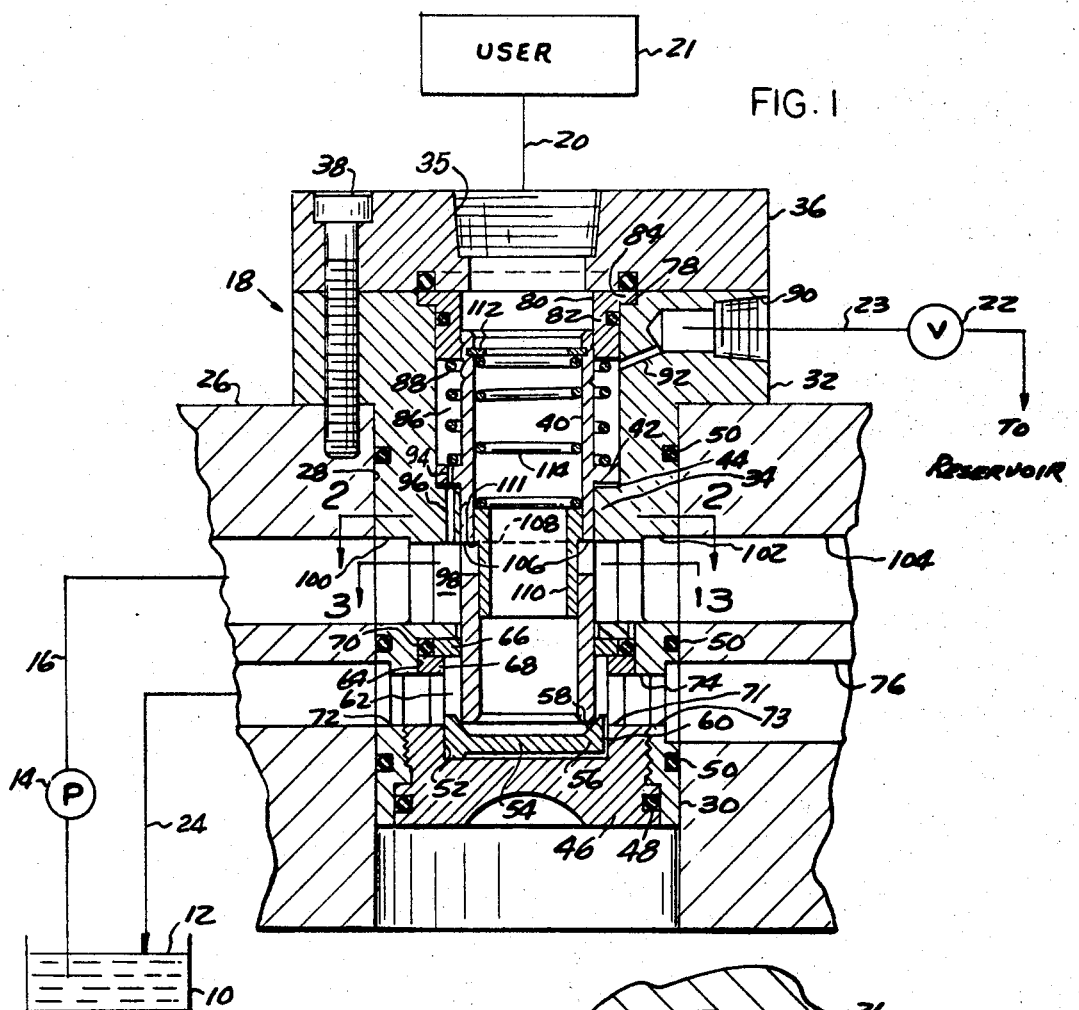

The present application is a continuation in part of application Ser. No. 390,510, filed Aug. 19, 1964, and now Patent No. 3,283,779 issued Nov. 8, 1966 and which was a continuation in part of application Ser. No. 371,884 filed May 28, 1964, and now Patent No. 3,227,179, issued Jan. 4, 1966, and which was a continuation in part of application Ser. No. 163,618, filed Jan. 2, 1962, now abandoned.

The present invention relates to fluid systems, particularly to such a system employing one or more line valves which are controlled by remotely positioned pilot valves, and more particularly to such a system having one or more improved cartridge type line valves utilizing inherent system pressures for operation of the valve and including automatically operable pressure relief means.

My aforementioned patents disclose an improved cartridge type fluid valve intended to be controlled by a pilot valve for alternately supplying fluid under pressure to a fluid user and then exhausing the fluid from the user. The cartridge valves of the aforementioned patents utilize inherent fluid system pressures for selective operation of the valve and incorporate a pressure relief means so that the pressure of the fluid delivered to the fluid user cannot exceed a desired value.

While the cartridge valves of my aforementioned patents have proven to be highly satisfactory for many fluid systems, it has been found that in some fluid systems it is desirable to increase the responsiveness of the cartridge valve to the control of the pilot valve for exhausting the fluid user and to close fluid flow from the pump to the fluid user. In the cartridge valves of my aforementioned patents, the valves preferably take the form of a housing having an inlet adapted for connection to a pump for supplying a source of fluid under pressure, a port adapted for a connection to a fluid user and an outlet adapted for connection to a fluid reservoir. A hollow piston axially slidably disposed in the housing has an interior in fluid communication with the user. The pilot valve is operable to move the hollow piston between a first position wherein it provides communication between the inlet to the user while restricting fluid flow through the outlet, and a second position wherein the hollow piston restricts fluid flow through the inlet and opens the outlet to permit the fluid user to exhaust therethrough. The movement of the hollow piston is dependent on the inherent pressures in the fluid system and is controlled by the pilot valve.

The present application provides an improvement over the aforementioned disclosures by providing a second piston member axially slidably disposed within the first piston member in such a fashion that it permits a faster build-up of actuating pressure operable to restrict fluid flow through the inlet and to open the fluid outlet in response to a signal from the pilot valve for exhausting the fluid user. The second piston member is spring loaded to establish an initial pressure buildup required for the cartridge valve to change from a condition wherein it supplies fluid to the user to a condition wherein it exhausts fluid from the user. Further, the cartridge valve of the present invention is constructed to permit several valves to be connected in series to control the operation of a corresponding number of fluid users supplied from a single source of pressurized fluid.

It is an object then of the present invention to improve the utilization of fluid systems by providing a new cartridge type line valve utilizing inherent system pressures to regulate fluid flow to and exhaust from a fluid user and including means for increasing the responsiveness of the valve to a change in the system pressure for exhausting the fluid user.

It is still another object of the present invention to improve fluid systems by providing a combination reverse flow and pressure relief line valve incorporating means operable to reduce the delay in low pressure systems in developing a pressure sufficient to actuate reverse flow through the valve.

It is still another object of the present invention to improve fluid systems by providing a new cartridge type line valve constructed to permit any number of such valves to be connected in series to control a plurality of fluid users through a single pumping means.

Figures 2, 3:
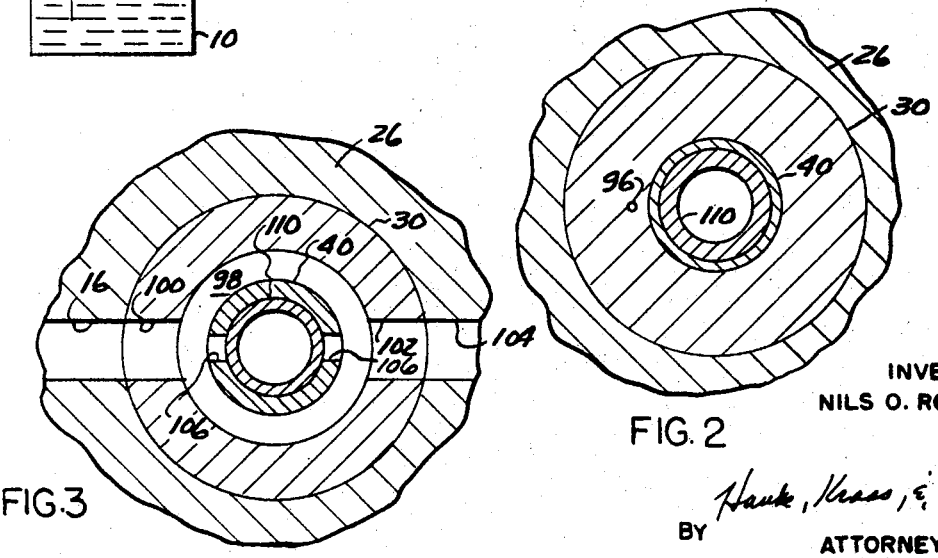

Still further objects and advantages of the present invention will readily occur to one skilled in the art to which the invention pertains upon reference to the following description and the accompanying drawings in which like reference characters refer to like parts throughout the several views and in which FIG. 1 is a diagrammatic view of a preferred fluid system of the present invention including a longitudinal cross-sectional view of a preferred valve structure;

FIG. 2 is a transverse cross-sectional view of the valve structure illustrated in FIG. 1 and taken substantially along lines 2—2 of FIG. 1; and FIG. 3 is a transverse cross-sectional view taken along lines 3—3 of FIG. 1.

Description

Now referring to the drawings for a more detailed description of the present invention, FIG. 1 illustrates diagrammatically a preferred fluid system as comprising a reservoir 10 of any suitable type to store a fluid 12. A pump 14 is normally operable to deliver fluid under pressure through a conduit 16 through a valve structure generally indicated at 18 and a conduit 20 to a fluid user 21. It is to be understood that the fluid user 21 is illustrated diagrammatically and can be any type of fluid user where it is desirable to selectively supply fluid pressure to the user and exhaust pressure from the user.

A pilot valve indicated diagrammatically at 22 may be of any conventional type, and is operable to variably open and close fluid flow through a relief conduit 23 connecting the valve structure 18 and the reservoir 10. The valve structure 18 is also connected by a conduit 24 to the reservoir 10.

Now as illustrated in the figures, the valve structure 18 preferably comprises a manifold 26 provided with a longitudinal bore 28. It is to be understood that normally the manifold 18 will provide a connection between a single pump 14 and a plurality of similar line valves 18 each of which is associated with a corresponding user. However for purposes of description, only one valve 18 is illustrated in a section of the manifold 26.

A sleeve member 30 is disposed in the bore 28 and is provided with a radially outwardly extending flange portion 32 adjacent one end thereof and a radially inwardly extending flange portion 34 axially inwardly spaced from the flange 32.

A cap member 36 secures a flange 32 to the manifold 26 by any convenient means such as bolts 38 to close the upper end of the sleeve 30.

A main hollow piston member 40 is axially slidably carried in the sleeve member 30 and is provided with a length less than the length of the bore of the sleeve 30. The main piston 40 has a radially outwardly extending annular flange 42 which is disposed slightly above the flange portion 34 of the sleeve member 30 to define a narrow annular chamber 44 between the flange 42 and the flange 34.

The upper and lower ends of the piston 40 have substantially equal diameters and therefore equal surface areas. The upper and lower surface areas of the flange 42 also are equal.

An end plug 46 is threadably secured to the bottom end of the sleeve 30 and is provided with an O-ring seal 48 to fluidly seal the engagement between the plug 46 and the sleeve 30.

The circumference of the sleeve 30 is also provided with a plurality of axially spaced O-ring seals 50 which provide a fluid tight engagement between the sleeve 30 and the manifold 26.

The inner face of the plug 46 is provided with a circular recess 52 having a diameter larger than the diameter of the main piston 40. A disc shaped member 54 having an axially enlarged circumference 56 is disposed in the recess 52 of the plug 46. The upper face of the disc 54 is chamfered as at 58 to provide a seat for the lower end of the piston 40. The circumference of the disc 54 is provided with an axial groove 60 to relieve fluid pressure between the under side of the disc 54 and the bottom of the recess 52.

The recess 52 of plug 46 provides an annular chamber 62 around the lower end of the piston 40 and adjacent the disc member 54. Thus the groove 60 in the disc 54 provides fluid communication between the annular chamber 62 and the under side of the disc 54. An annular groove 64 is axially spaced from the plug 46. An annular ring 66 having an inner diameter closely corresponding to the outer diameter of the main piston 40 is disposed against one face of the groove 64 and retained therein by an end 68 of the plug 46. An O-ring seal 70 is disposed in the groove 64 and behind the ring 66 to cooperate with the ring 66 to provide a fluid tight self-aligning seal between the outer surface of the main piston 40 and the sleeve 30.

The cap 46 further has an annular recess 71 and a port 72 to provide fluid communication between the annular chamber 62 to the reservoir 10 through an annular recess 73 provided in sleeve 30 and the conduit 24. A port 74 preferably diametrically disposed relative to the port 72 is provided in the plug 46 and sleeve 30 to provide communication from the annular chamber 62 to a neighboring line valve (not shown) through a passage 76 provided in the manifold 26. Now it can be seen in FIG. 1 that when the main piston 40 is in its lower position, the lower edge of the piston 40 seats against the disc member 54 to close communication between the interior of the main piston 40 and the annular chamber 62.

An annular groove 78 is provided in the capped end of the sleeve 30. A ring structure 80 comprises an axially extending base portion 82 and a radially outwardly extending flange portion 84. The flange portion 84 is seated in the groove 78 and the ring structure 80 and the flange 42 of the hollow piston 40 are axially spaced to provide an annular cavity 86 between the free end of the base portion 82 and the upper surface of the flange 40. The downward directed free end of the base portion 82 forms a seat for a spring 88 engaging the upper surface of the flange 42 to bias the piston 40 downwardly against disc 54 seated in the recess 52 of the plug 46.

The ring 66 and compressible O-ring seal 70 permit the lower end of piston 40 to self-alignedly seat against chamfered section 58 of the disc 54.

The flange 32 of the sleeve member 30 is provided with a control outlet port 90 connected to the reservoir 10 through the relief conduit 23 and the pilot valve 22. A passage 92 is provided in the sleeve member 30 to provide communication between the control outlet port 90 and the cavity 86. A restricted orifice 94 is provided through the flange 42 to fluidly connect the annular cavity 86 with the chamber 44. A passage 96 extends through the flange portion 34 of the sleeve 30 to provide communication between the chamber 44 and an annular chamber 98 provided in the sleeve 30. The chamber 98 is connected to the reservoir 10 through an inlet port 100, the conduit 16 and the pump 14. A port 102 is provided in an annularly spaced position from the port 100 and registers with the chamber 98 to provide fluid communication through a passage 104 in the manifold 26 to a neighboring line valve (not shown).

The piston 40 is provided with annularly spaced apertures or through ports 106. The inner circumferential surface of the main piston 40 is provided with a reduced diameter portion terminating near its mid-portion to provide a seat 108 for an inner axially slidable piston 110. When the inner piston 110 is in its downward position, the lower section closes off the ports 106 to prevent fluid communication between the annular chamber 98 and the interior of the main piston 40. The piston 110 has a circumferential flange 111 which engages the seat 108. An annular retainer ring 112 is seated on the inner side of the main piston 40 adjacent its upper end and provides a seat for spring 114 which normally biases the inner piston member 110 toward its downward seated position.

The cap member 36 is provided with a port 35 in communication with the fluid user 21 through the conduit 20. When it is desired to supply pressurized fluid through the conduit 20 to the fluid user 21, the pilot valve 22 is regulated to a completely closed condition. Pressurized fluid is delivered from the reservoir 10 by the pump 14 through the conduit 16 to the chamber 98 of the valve 18. The passage 96 transmits the pressure produced by the pump 14 from the chamber 98 to the cavity 44 beneath the flange 42. With the pilot valve 20 closed and assuming a constant pump pressure, the fluid pressure on each side of the flange 42 will be substantially equal because of the communication across the flange 42 provided by the passage 94. The spring 88 will then urge the main piston 40 to the axial position illustrated in FIG. 1. In this axial position of the piston 40, the ports 106 register with the chamber 98 and the lower edge of the piston 40 engages the chamfered portion 58 of the disc 54 to close communication between the interior of the piston 40 and the outlet port 72. The pressurized fluid then acts on the flange 111 of the inner piston 110 to produce an upward force on the piston 110 sufficient to overcome the stiffness of the spring 114. The piston 110 moves upwardly until its lower end clears the ports 106 to provide communication between the chamber 98 through the ports 106 to the interior of the main piston 40. Thus pressurized fluid is delivered by the pump 14 through the interior of the main piston 40 and out the port 35 to the fluid user 21.

Thus it can be seen that normally when the pump 14 is delivering fluid from the reservoir 12 to the fluid user 21, the main piston 40 is in the downward position illustrated in FIG. 1, and the inner piston 110 is in its upward position wherein the ports 106 are uncovered by the piston 110.

When it is desired to exhaust the fluid user 21 through the valve 18, the pilot valve 22 is regulated from the closed position to an open position to open the conduit 23 and the port 90 to the lower pressure on the return side of the system. The pressure is thus relieved from the cavity 86 to produce a pressure differential across flange 42 sufficient to move the main piston 40 upwardly and axially against the force of the spring 88. The passage 94 has a smaller cross-sectional area than the passages 96 and 92. Thus the flow of fluid through the passage 92 is greater than through the restricted orifice 94 thereby producing a pressure differential across the flange 42 sufficient to raise the lower end of the main piston 40 off the disc 54.

The main piston 40 rises off the disc 54, thus providing communication between the interior of the piston 40 and the discharge port 72. When the piston 40 has risen sufficiently that ports 106 are closed from annular chamber 98, the inner piston 110 moves downwardly relative to piston 110 to seat against seat 108. When the ports 106 are closed, the user 21 exhausts directly through piston 40 to reservoir 12.

In summary, the inner piston 110 cooperates with the main piston 40 to provide a more responsive change in the operative condition of the valve 18 from a condition wherein the pump supplies fluid to the user 21 to a condition wherein the valve 18 exhausts fluid from the user 21.

Another advantage of the improved line valve construction is that the responsiveness of the inner piston member to a change in the operating condition of the pilot valve 22 reduces the fluctuations in the fluid pressure in the passage 104 supplying fluid to the neighboring line valve assembly.

It can further be seen that the valve 18 of the present invention, like the valves of my aforementioned patents, acts also as a pressure relief valve. If the pressure of the fluid delivered through the conduit 16 exceeds a predetermined value and valve 22 is slightly open to permit fluid flow from cavity 86, the increased pressure will be transmitted through the passage 96 to the chamber 44 to cause the piston 40 to move upwardly against the spring 88 to open the interior of the piston 40 to the reservoir 10 through the lower port 72.

Although I have described but one embodiment of my present invention, it is apparent that many changes and modifications can be made therein without departing from the spirit of the invention as expressed by the scope of the appended claims.

I claim:
1. A fluid valve, comprising:
 (a) a housing having an inlet adapted for connection to a source of fluid under pressure, a port, and an outlet;
 (b) a control outlet provided in said housing and means providing communication between said control outlet and said inlet;
 (c) control valve means selectively operable to close and to variably open fluid flow through said control outlet;
 (d) second valve means disposed in said housing and having a first operative condition permitting fluid flow from said inlet to said port and closing fluid flow from said inlet to said outlet and a second operative condition closing fluid flow from said inlet to said port and opening fluid flow from said port to said outlet, said second valve means comprising;
  (1) an outer hollow piston axially slidably disposed in said housing and movable between a first axial position and a second axial position;
  (2) an inner hollow piston slidably carried by said outer piston and movable relative thereto between two axially spaced operating positions;
  (3) means actuated by a movement of said outer piston from one of said axial positions to create an out-of-balance pressure condition on said inner piston effective to cause said inner piston to move toward one of said operating positions; and
 (e) means operable upon said control valve means being variably opened to urge said outer piston from one of said axial positions toward the other of said axial positions.

2. The fluid valve as defined in claim 1, wherein said outer piston has a first open end providing communication between said port and the interior of said piston, and said piston further having an aperture uncovered by said inner piston as relative movement occurs to provide communication between said inlet and the interior of said piston.

3. The fluid valve as defined in claim 1, wherein said outer piston has a flanged portion disposed intermediate said inlet and said control outlet and said means providing communication between said control outlet and said inlet includes a first passage provided in said housing and a second passage provided in said flanged portion, said passages having different cross-sectional areas and being connected in series so that varying fluid flow through said control outlet produces a pressure unbalance on said flanged portion sufficient to urge said piston toward one of said axial positions.

4. The fluid valve as defined in claim 1, wherein said outer piston is hollow and has opposite open ends; and including a disc member disposed in said housing transversely to the movement of said outer piston and said disc member and one of said outer piston open ends being interengageable to close fluid flow from the interior of said outer piston through said outlet.

5. The fluid valve as defined in claim 1, wherein said outer piston is provided with an aperture, and said inner piston is axially slidably carried in said outer piston and movable relative thereto between a first axial position covering said aperture and a second axial position uncovering said aperture, and including means for resiliently urging said inner piston toward said first axial position, said inner piston having a pressure area exposed to fluid pressure in the interior of said piston, said fluid pressure creating an axial force in opposition to said resilient urging means.

6. The fluid valve as defined in claim 5, wherein said outer piston has a flanged portion disposed intermediate said inlet and said control outlet and said means providing communication between said control outlet and said inlet includes a first passage provided in said housing and a second passage provided in said flanged portion, said passages having different cross-sectional areas and being connected in series so that varying fluid flow through said control outlet produces a pressure unbalance on said flanged portion sufficient to urge said outer piston toward one of said axial positions, and one of said axial positioning said outer piston aperture in registry with said inlet.

7. The fluid valve as defined in claim 6, wherein when said outer piston is in one of said axial positions closing fluid flow from said inlet to said outlet and registering said aperture with said inlet, said fluid pressure creates an axial force on the pressure area of said inner piston sufficient to overcome said resilient urging means so that said inner piston uncovers said aperture to permit fluid flow from said inlet through said aperture and said outer piston to said port.

8. The fluid valve as defined in claim 6, wherein said resilient urging means comprises a spring bias member, and when said second valve means is in said first operative condition permitting fluid flow from said inlet to said port, the fluid pressure of said fluid flow creates a force on said inner piston pressure area sufficient to overcome the urging of said spring bias member, but when said outer piston moves away from an axial position closing fluid flow from said port through said outlet a force unbalance is created on said outer piston, and said spring bias member has a stiffness sufficient to overcome the axial force created by said fluid on said inner piston so that said inner piston moves to a position covering said outer piston aperture whereby fluid flow from said inlet to said port is closed.

9. The fluid valve as defined in claim 5, including means resiliently urging said outer piston toward said first axial position, said outer piston being provided with a substantially annular flange, and said means providing communication between said control outlet and said inlet comprising a pair of fluid passages connected in series intermediate said inlet and said control outlet, one of said passages being provided in said flange and said passages each having a different cross sectional area, with the passage being provided in said flange being of a smaller cross sectional area than the other of said passages so that upon an increase in the fluid flow from said control outlet or an increase at said inlet, a pressure differential is produced across said flange to move said outer piston axially in opposition to said resilient urging means.

10. The fluid valve as defined in claim 9, including a disc member disposed transversely to said outer piston and having an annular enlargement with an outer diameter greater than said outer piston, said enlargement having an annular surface regularly narrowed in a direction away from said outer piston so that the end of said outer piston is self-alignedly and sealingly engaged with said disc when said outer piston is in said first axial position.

11. The fluid valve as defined in claim 1 and including said housing having a cavity carrying said pistons, a disc disposed in one end of said cavity and having an axial enlargement having a tapered surface, said surface being engageable with the open end of said outer piston to close fluid flow from the interior of said outer piston through said outlet.

12. The fluid valve as defined in claim 11, wherein said enlargement provides an annular tapered surface regularly narrowed in a direction away from the open end of said outer piston and engageable with the peripheral edge of the extreme end of said outer piston.

13. The fluid valve as defined in claim 12, wherein said disc has a diameter corresponding to said cavity to permit axial slidable movement toward and away from said abutment section, and including means providing fluid communication between opposite sides of said disc.

14. The fluid valve as defined in claim 13, wherein said last mentioned means comprises a groove formed in the circumferential surface of said disc and running the full axial length of said disc.

15. The fluid valve as defined in claim 11, including seal means disposed in said cavity and around said piston between said first and second ports, said seal means comprising said housing having a radially directed peripheral recess between said first and second ports, an annular and radially resilient seal member disposed in said recess, and a ring member having an outer diameter associated with said annular seal member and an inner diameter corresponding to the circumferential surface of said outer piston and slidably associated therewith so that said seal member and said ring member cooperate to self-alignedly guide said outer piston in movement toward and away from said disc member.

16. A fluid valve, comprising:
(a) a housing having an inlet adapted for connection to a source of fluid under pressure, a port, and an outlet;
(b) a control outlet provided in said housing and means providing communication between said control outlet and said inlet;
(c) control valve means selectively operable to close and to variably open fluid flow through said control outlet;
(d) second valve means disposed in said housing and having a first operative condition permitting fluid flow from said inlet to said port and closing fluid flow from said inlet to said outlet and a second operative condition closing fluid flow from said inlet to said port and opening fluid flow from said port to said outlet, said second valve means comprising;
  (1) a first piston axially slidably disposed in said housing and movable between a first axial position and a second axial position;
  (2) a second piston slidably carried by said first piston and movable relative thereto between two axially spaced operating positions;
  (3) means actuated by a movement of said first piston from one of said axial positions to create an out-of-balance pressure condition on said second piston effective to cause said second piston to move toward one of said operating positions; and
(e) means operable upon said control valve means being variably opened to urge said first piston from one of said axial positions toward the other of said axial positions.

17. A fluid valve comprising:
(a) a housing having an inlet adapted for connection to a source of fluid under pressure, a port, and an outlet;
(b) a piston axially slidably carried in said housing and having means opening fluid flow from said inlet to said port and closing fluid flow from said inlet to said outlet in a first axial position of said piston and closing fluid flow from said inlet to said port and opening fluid flow from said port to said outlet at a second axial position of said piston said means including a disc disposed within said housing in a position adjacent said outlet and one end of said piston, said disc having an axial enlargement on the side associated with said piston, and said enlargement having a tapered surface engageable with the open end of said piston to close communication between the interior of said piston and said port as said piston moves against said disc;
(c) means resiliently urging said piston toward said first axial position;
(d) a control outlet provided in said housing and means providing communication at all times between said control outlet and said inlet;
(e) valve means selectively operable to close and to variably open fluid flow through said control outlet, and
(f) means operable upon said valve means being variably opened to urge said piston toward said second axial position.

References Cited

UNITED STATES PATENTS 2,931,673 4/1960 Gondek _____ 251—325
3,319,653 5/1967 Stephens _____ 137—596
3,349,801 10/1967 Grundmann ___ 137—625.61 XR HENRY T. KLINKSIEK, Primary Examiner.